(12) United States Patent
Ishihara et al.

(10) Patent No.: US 11,472,570 B2
(45) Date of Patent: Oct. 18, 2022

(54) SYSTEM AND METHOD FOR MODULATING PREMATURE DESCENT PROTECTION ENVELOPE

(71) Applicant: HONEYWELL INTERNATIONAL INC., Morris Plains, NJ (US)

(72) Inventors: Yasuo Ishihara, Kirkland, WA (US); Steve Johnson, North Bend, WA (US); Kevin J Conner, Kent, WA (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 321 days.

(21) Appl. No.: 16/735,261

(22) Filed: Jan. 6, 2020

(65) Prior Publication Data

US 2020/0148385 A1   May 14, 2020

Related U.S. Application Data

(63) Continuation of application No. 14/258,515, filed on Apr. 22, 2014, now Pat. No. 10,543,932.

(51) Int. Cl.
*B64D 45/04* (2006.01)
*G01C 23/00* (2006.01)
(Continued)

(52) U.S. Cl.
CPC ............. *B64D 45/04* (2013.01); *G01C 23/00* (2013.01); *G05D 1/0676* (2013.01);
(Continued)

(58) Field of Classification Search
CPC ...... G01C 23/00; G01C 21/00; G01C 23/005; G08G 5/0021; G08G 5/025; G08G 5/0086;
(Continued)

(56) References Cited

U.S. PATENT DOCUMENTS 3,922,637 A   11/1975   Bateman
4,536,843 A   8/1985   Lambregts
(Continued)

FOREIGN PATENT DOCUMENTS

CN   102034368 A   4/2011
CN   103413464 A   11/2013
(Continued)

OTHER PUBLICATIONS

Sheng et al., Research on Alarm Curve Threshold of Near-Earth Alarm System, Computer Simulation, Feb. 28, 2110, pp. 67-71, vol. 28, No. 2, School of Automation, Nanjing University of Aeronautics and Astronautics, Jiangsu Yixing, Beijing.
(Continued)

*Primary Examiner* — Jelani A Smith
*Assistant Examiner* — Paul A Castro
(74) *Attorney, Agent, or Firm* — Lorenz & Kopf, LLP

(57) ABSTRACT

A system and method of shifting a premature descent protection envelope for an aircraft has been developed. First, a premature descent protection envelope (PDP) is determined including a first boundary at a first distance from the runway. Next, a nominal approach path is determined for approaching the runway and an approach path angle. Also, a flight path angle of the aircraft is determined. The first boundary is shifted in an upward direction from the runway in response to the aircraft being below the nominal approach path, and the flight path angle being greater than the nominal approach path angle.

17 Claims, 7 Drawing Sheets

(51) Int. Cl.
*G08G 5/02* (2006.01)
*G08G 5/00* (2006.01)
*G05D 1/06* (2006.01)
*G08G 5/04* (2006.01)

(52) U.S. Cl.
CPC .......... *G08G 5/0021* (2013.01); *G08G 5/025* (2013.01); *G08G 5/045* (2013.01)

(58) Field of Classification Search
CPC .... G08G 5/0008; G08G 5/0078; G08G 5/045; B64D 45/04; G05D 1/0676; G05D 1/0055; G05D 1/0202; G01S 13/94; G01S 15/101; G01S 15/88; G01S 19/07; G01S 19/11; B64C 19/00
See application file for complete search history.

(56) References Cited

U.S. PATENT DOCUMENTS

| | | | |
|---|---|---|---|
| 4,567,483 A | 1/1986 | Bateman et al. | |
| 6,785,594 B1* | 8/2004 | Bateman | G01S 19/39 701/9 |
| 6,980,892 B1* | 12/2005 | Chen | G01C 21/005 340/970 |
| 7,619,556 B1 | 11/2009 | McCusker | |
| 8,116,923 B2 | 2/2012 | Ishihara et al. | |
| 2002/0089433 A1 | 7/2002 | Bateman et al. | |
| 2002/0116097 A1* | 8/2002 | Block | G01C 23/00 701/9 |
| 2010/0123395 A1 | 5/2010 | Tian et al. | |
| 2010/0123398 A1* | 5/2010 | Tian | H05B 45/30 315/119 |
| 2011/0035080 A1 | 2/2011 | Murphy | |
| 2012/0095625 A1 | 4/2012 | Ishihara et al. | |
| 2012/0265376 A1 | 10/2012 | Fleiger-Holmes et al. | |
| 2014/0354456 A1 | 12/2014 | Gannon et al. | |
| 2015/0298821 A1* | 10/2015 | Ishihara | G01C 23/00 701/18 |

FOREIGN PATENT DOCUMENTS

| | | |
|---|---|---|
| CN | 103287582 B | 12/2016 |
| EP | 2135806 A1 | 12/2009 |
| WO | 99/32850 A1 | 7/1999 |

OTHER PUBLICATIONS

Dibley, H.: Incorrect Simulation of Baro-Altitude Temperature Errors, Effect on Safety including Non-Precision Approaches; AIAA 4th Aviation Technology, Integration and Operations (ATIO) Forum, ATIO-14: Improving Safety of Aircraft Operations, Publication Date: Sep. 20, 2004-Sep. 22, 2004.

* cited by examiner

SYSTEM AND METHOD FOR MODULATING PREMATURE DESCENT PROTECTION ENVELOPE

CROSS-REFERENCE TO RELATED APPLICATION(S)

This application claims priority from U.S. patent application Ser. No. 14/258,515, titled "SYSTEM AND METHOD FOR MODULATING PREMATURE DESCENT PROTECTION ENVELOPE" that was filed on Apr. 22, 2014.

TECHNICAL FIELD

The exemplary embodiments described herein generally relate to an aircraft enhanced ground proximity warning system (EGPWS) and more particularly to modulating a premature descent protection (PDP) envelope, e.g., a runway field clearance floor (RFCF) envelope or a terrain clearance floor (TCF) envelope, for a selected runway to provide appropriate alerts.

BACKGROUND

An important advancement in aircraft flight safety has been the development of EGPWSs. These warning systems analyze the flight parameters of the aircraft and the terrain surrounding the aircraft. Based on the analysis, these warning systems provide alerts to the flight crew concerning possible inadvertent collisions with terrain or other obstacles. Further, these EGPWSs ensure, by providing an alert, that the pilot maintains a minimum altitude with regard to terrain underlying the aircraft. The RFCF maintains the aircraft at an appropriate altitude relative to the runway field elevation.

The EGPWS generates an RFCF envelope that provides minimum altitudes that the aircraft should maintain above the selected runway elevation as the aircraft approaches the runway for landing. If the altitude of the aircraft with respect to the selected runway elevation is less than the minimum altitude required by the RFCF envelope, the EGPWS will provide an appropriate alert.

FIG. 1 illustrates a typical RFCF envelope 110 generated by at least one EGPWS. The RFCF envelope 110 is typically generated with reference to a selected runway 112. For different distances from the selected runway 112, the RFCF envelope 110 prescribes different minimum altitudes that the aircraft should maintain above the selected runway elevation. An alert is provided if the aircraft intrudes within the RFCF envelope 110.

For example, if an aircraft is within 5 nm from the runway 112, the RFCF prescribes that the aircraft maintain at least an altitude of 300 feet above the runway elevation. As such, if the aircraft is flying an approach that has an elevation of 900 feet, the aircraft should maintain an altitude of at least 1200 feet. In this example, if the aircraft dips below 1200 feet altitude to the destination runway 112, the RFCF will provide an appropriate alert.

Importantly, with reference to FIG. 1, for distances closer to the selected runway 112, the RFCF envelope 110 requires smaller minimum clearance altitudes that the aircraft should maintain above the selected runway elevation. This portion 114 of the RFCF envelope 110 reflects a landing pattern of the aircraft. The altitudes at various distances from the selected runway 112 are selected to provide proximity warning protection, while also reducing generation of nuisance alarms that may disrupt the flight crew during landing. For example, when the aircraft is 4.5 nm from the selected runway, the flight crew will not receive an alert unless the aircraft dips to an altitude that is less than 300 feet above the runway elevation. The RFCF envelope 110 typically may be spaced 1.0 mile from the runway; however, preferably is 0.5 mile from the runway.

For most instances, the RFCF envelopes generated by the EGPWS, such as the RFCF envelope 110 illustrated in FIG. 1, are generally advantageous as they provide ground proximity warning protection, while at the same time reducing nuisance alarms. However, there may be specific flight profiles where improvements to the system may be made.

Specifically, as described above, the RFCF envelope 110 requires minimum altitudes that the aircraft should maintain above the selected runway depending upon the distance between the aircraft and the selected runway. While the RFCF envelope 110 is typically more than adequate for ground proximity warning protection, problems may occur when undesired flight profiles interfere with this protection.

Typically, the RFCF envelope 110 terminates a mile, as shown in FIG. 1, from the end of the runway. An undesired flight profile, for example, a steep descent, may place the aircraft in close proximity to the terrain within this mile without receiving an alert.

Accordingly, it is desirable to provide a system and method for modifying the RFCF envelope with regard to an undesired flight profile. Furthermore, other desirable features and characteristics of the exemplary embodiments will become apparent from the subsequent detailed description and the appended claims, taken in conjunction with the accompanying drawings and the foregoing technical field and background.

BRIEF SUMMARY

A system and method are provided for modifying the terrain clearance floor envelope in response to an undesired flight profile.

A system is provided for shifting a premature descent protection envelope for an aircraft making an approach to a selected runway. The system comprises: at least one data storage element configured to: store a runway database including data associated with the selected runway; an avionics system configured to: determine flight parameters for an aircraft making an approach to the runway; determine the premature descent protection envelope (PDP) for the selected runway; and determine a nominal approach path angle to the runway from a precision approach path indicator/visual approach slope indicator (PAPI/VASI) slope; and a processor coupled to the data storage element and the avionics system, and configured to: dynamically shift the determined PDP envelope in an upward direction from the selected runway in response to the flight parameters and the nominal approach path angle when the aircraft is making the approach within the PDP envelope, where the shifted PDP envelope provides additional notice of premature descent by the aircraft.

A method is provided for of shifting a premature descent protection envelope for an aircraft approaching a runway. The method comprises: determining the premature descent protection envelope (PDP) including a first boundary at a first distance from the runway; determining a nominal approach path for approaching the runway and an approach path angle; determining a flight path angle of the aircraft; and shifting the first boundary in an upward direction from the runway in response to the aircraft being below the nominal approach path, and the flight path angle being greater than the nominal approach path angle.

BRIEF DESCRIPTION OF THE DRAWINGS

The present invention will hereinafter be described in conjunction with the following drawing figures, wherein like numerals denote like elements.

DETAILED DESCRIPTION

Figure 1:
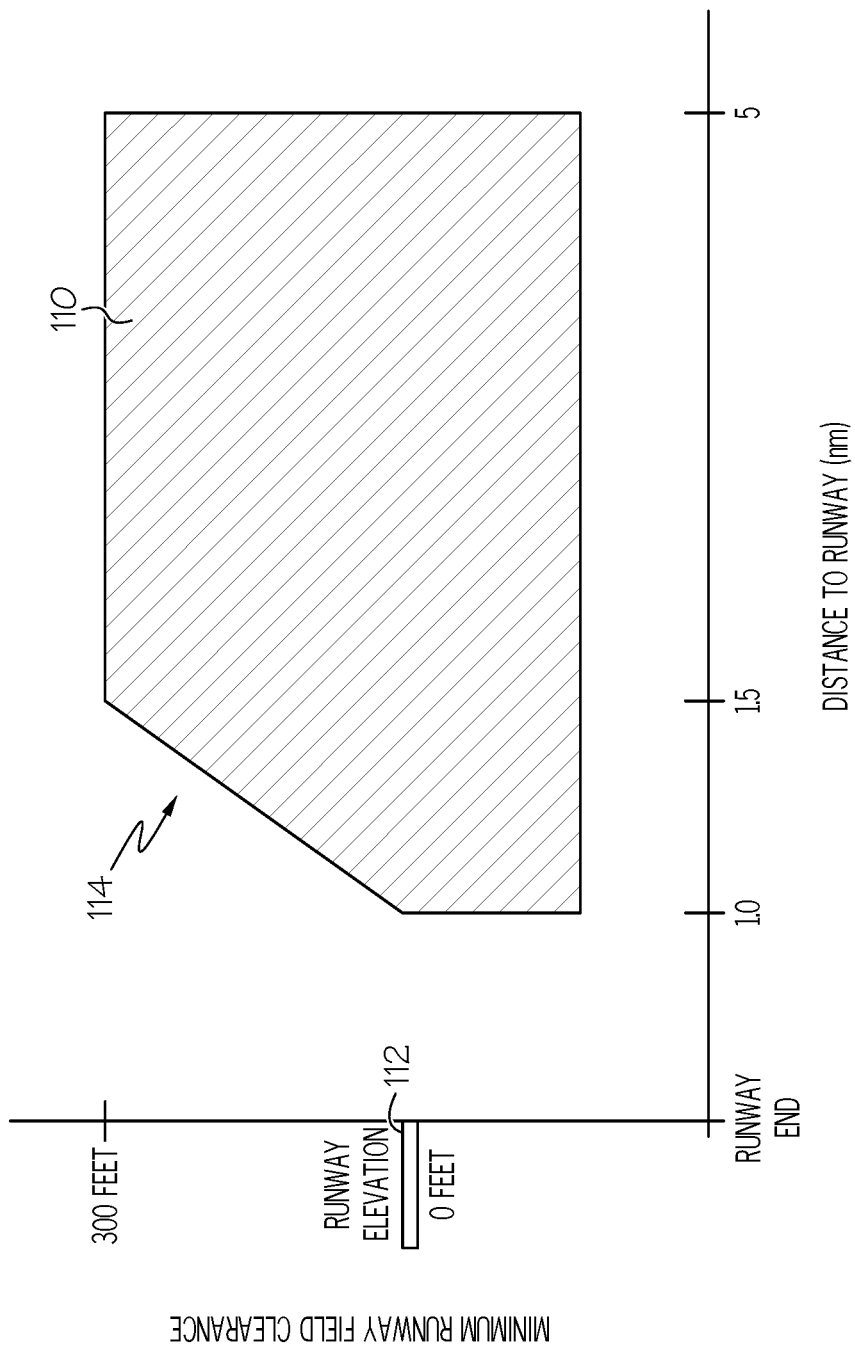
FIG. 1 is a graphical representation of a known RFCF envelope.

The following detailed description is merely illustrative in nature and is not intended to limit the embodiments of the subject matter or the application and uses of such embodiments. Any implementation described herein as exemplary is not necessarily to be construed as preferred or advantageous over other implementations. Furthermore, there is no intention to be bound by any expressed or implied theory presented in the preceding technical field, background, brief summary, or the following detailed description.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The word "exemplary" is used exclusively herein to mean "serving as an example, instance, or illustration." Any embodiment described herein as "exemplary" is not necessarily to be construed as preferred or advantageous over other embodiments. Any of the above devices are exemplary, non-limiting examples of a computer readable storage medium.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. Any of the above devices are exemplary, non-limiting examples of a computer readable storage medium In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

In accordance with the exemplary embodiments, a premature descent protection (PDP) envelope, for example, a runway field clearance floor (RFCF) envelope or a terrain clearance floor (TCF) envelope is modulated (biased or shifted) toward the destination runway end, in shape, e.g., having a ceiling (altitude) further from the runway elevation, when the aircraft is below the nominal approach path, e.g., an instrument landing system (ILS) glideslope, vertical navigation (VNAV) path angle, or precision approach path indicator/visual approach slope indicator (PAPI/VASI) slope, and if the flight path angle of the aircraft is greater than the nominal approach path angle. For example, when the nominal approach path angle is 3 degrees for the destination runway, if the aircraft is already determined to be below the approach path and its flight path angle is 4 degrees (steeper than the nominal approach path angle), then the PDP envelope is shifted toward the runway, changed in shape, or raised to a higher elevation. The greater the differential in angle between the nominal approach path angle and the flight path angle, the greater the modulation of the PDP envelope.

Figure 2:
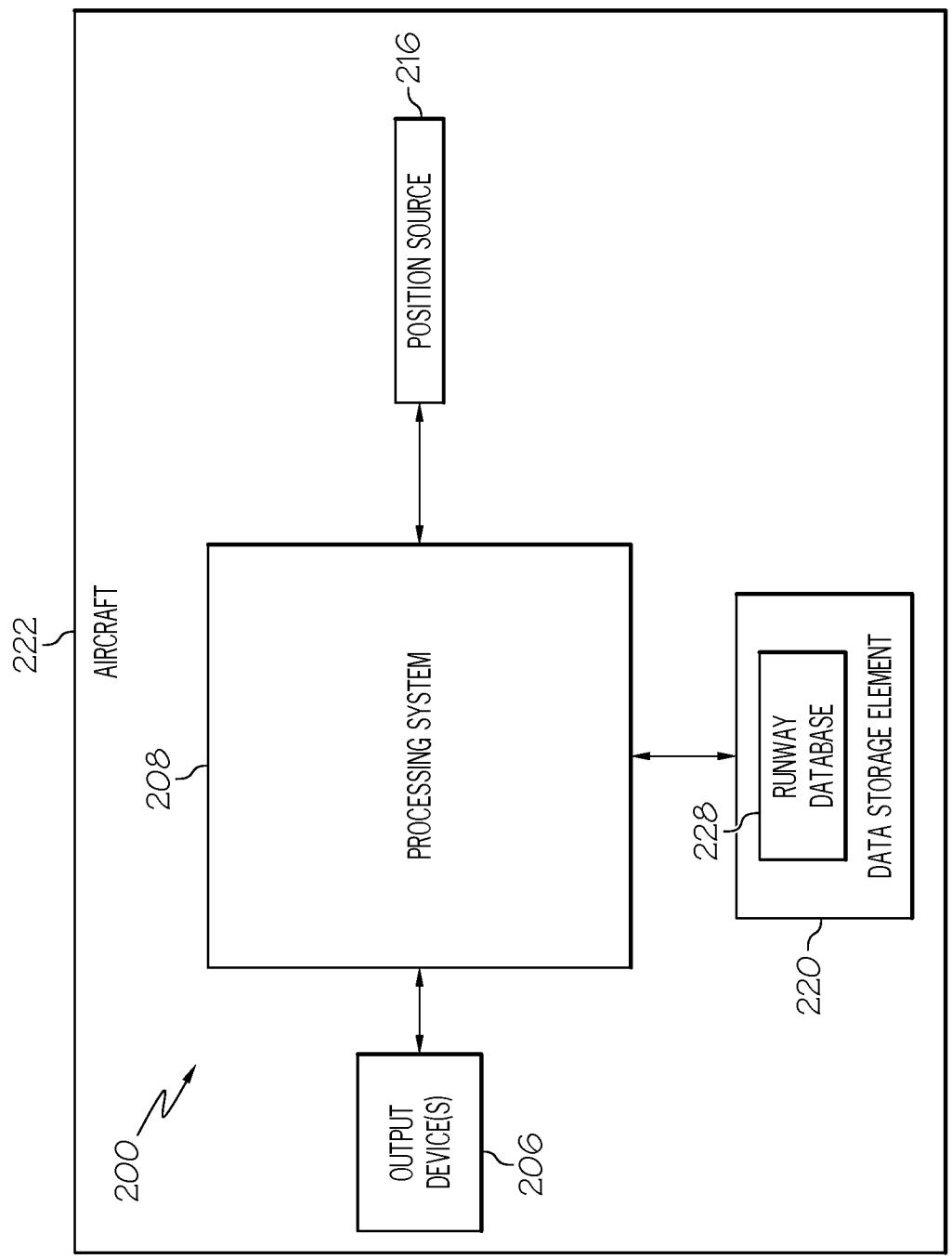
FIG. 2 is a block diagram of a known system suitable for use in an aircraft in accordance with the exemplary embodiments described herein.

FIG. 2 depicts an exemplary embodiment of a system 200, which may be located onboard a vehicle such as an aircraft 222. In an exemplary embodiment, the system 200 includes, without limitation, an output device 206, a processing system 208, a position source 210, and a data storage element 220 suitably configured to support operation of the system 200, as described in greater detail below. It should be understood that FIG. 2 is a simplified representation of a system 200 for purposes of explanation and ease of description, and FIG. 2 is not intended to limit the application or scope of the subject matter in any way. Practical embodiments of the system 200 and/or aircraft 222 will include numerous other devices and components for providing additional functions and features, as will be appreciated in the art. In this regard, although FIG. 2 depicts a single position source 210, in practice, the system 200 and/or aircraft 222 may include numerous position sources for obtaining and/or providing real-time flight-related information (parameters) used with the exemplary embodiments described herein, e.g., a global positioning system (GPS) and an inertial navigation system (INS) that determines both lateral and vertical positioning of the aircraft.

In an exemplary embodiment, the output device 206 is coupled to the processing system 208, and is cooperatively configured to provide an audio or visual alert to the pilot of the aircraft 222. The processing system 208 is coupled to the position source 216 for obtaining real-time positional data and/or information for the aircraft 222 to support operation of the system 200. The position source 216 may be realized as, for example, a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to provide vertical (altitude) and lateral (coordinates) positional data, as will be appreciated in the art.

The processing system 208 generally represents the hardware, software, and/or firmware components configured to facilitate communications and/or interaction between the audio output device 206, and the other elements of the system 200 and perform additional tasks and/or functions described in greater detail below. Depending on the embodiment, the processing system 208 may be implemented or realized with a general purpose processor, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. The processing system 208 may also be implemented as a combination of computing devices, e.g., a plurality of processing cores, a combination of a digital signal processor and a microprocessor, a plurality of microprocessors, one or more microprocessors in conjunction with a digital signal processor core, or any other such configuration. In practice, the processing system 208 includes processing logic that may be configured to carry out the functions, techniques, and processing tasks associated with the operation of the system 200, as described in greater detail below. Furthermore, the steps of a method or algorithm described in connection with the embodiments disclosed herein may be embodied directly in hardware, in firmware, in a software module executed by the processing system 208, or in any practical combination thereof. In some embodiments, the features and/or functionality of the processing system 208 may be implemented as part of an avionics system (not shown), as will be appreciated in the art.

The data storage element 220 may be realized as RAM memory, flash memory, EPROM memory, EEPROM memory, registers, a hard disk, a removable disk, a CD-ROM, or any other form of storage medium known in the art. Moreover, the data storage element 220 may be implemented using one component or a plurality of physically distinct components, as appropriate for the particular embodiment. In this regard, the data storage element 220 can be coupled to the processor 208 such that the processor 208 can be read information from, and write information to, the data storage element 220. In the alternative, the data storage element 220 may be integral to the processor 208. As an example, the processor 208 and the data storage element 220 may reside in an ASIC. The data storage element 220 includes a terrain database 224, which includes data related to runway elevation and location, for example.

It should be understood that FIG. 2 is a simplified representation of a system 200 for purposes of explanation and ease of description, and FIG. 2 is not intended to limit the application or scope of the subject matter in any way. In practice, the system 200 and/or aircraft 208 will include numerous other devices and components for providing additional functions and features, as will be appreciated in the art.

During the course of this description, like numbers may be used to identify like elements according to the different figures that illustrate the various exemplary embodiments.

Figure 3:
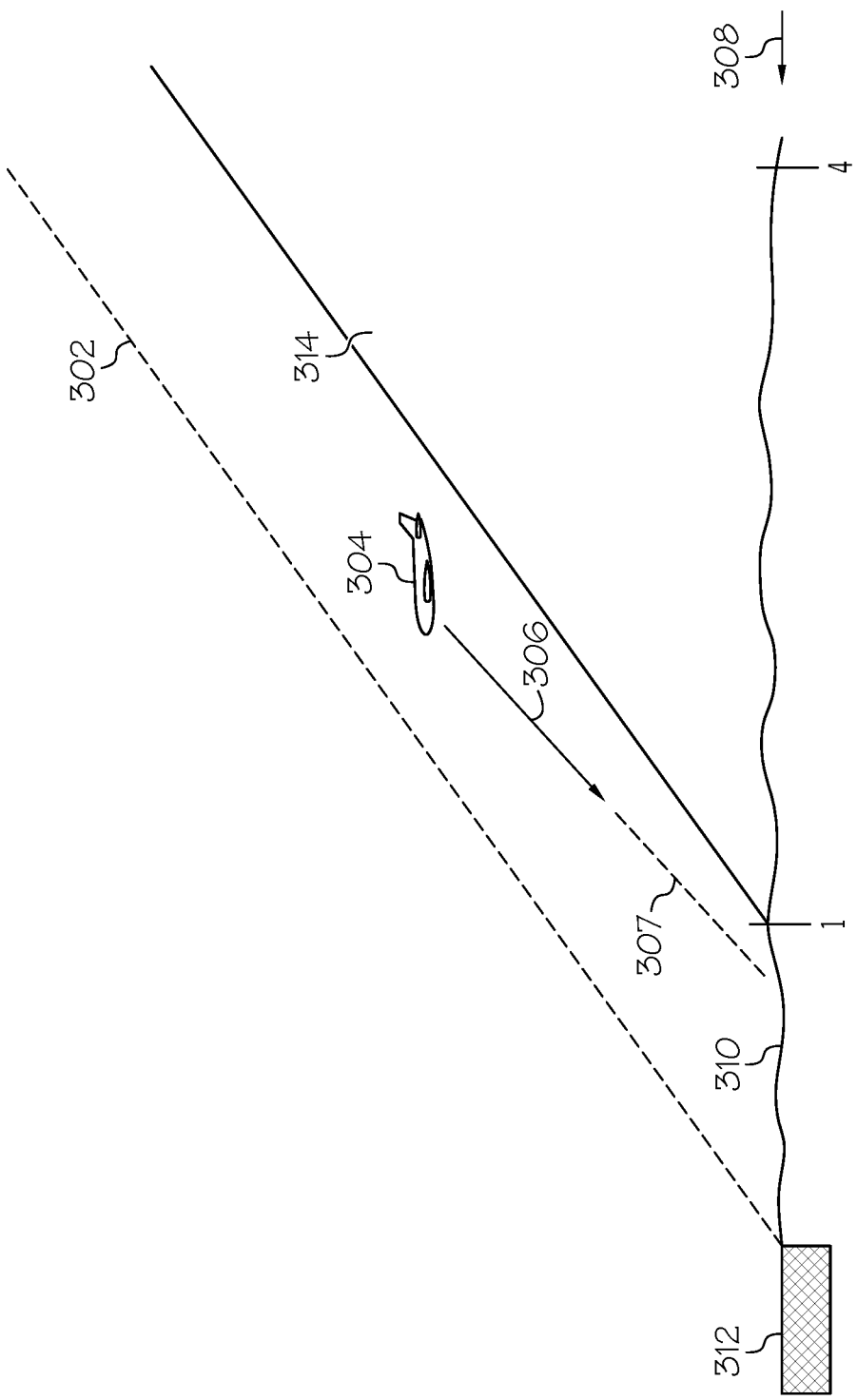
FIG. 3 is a graphical representation of an aircraft making an approach to a runway having the RFCF envelope associated therewith.

Referring to FIG. 3, a nominal approach path 302 is preferably stored in the runway database 228; however, may be provided, for example, by an ILS glideslope, VNAV path angle, or PAPI/VASI slope, for an approach to the runway 312. The runway 312 has a RFCF envelope 314 associated therewith that terminates, or ends typically about 1 mile from the end of the runway 312. While an RFCF envelope is presented in the described embodiments, it should be understood that other PDP envelopes, for example, a TCF envelope, may be used. An aircraft 304 is descending on an approach to the runway below the nominal approach path 302 and at a flight path angle 306 greater than the nominal approach path angle 302. For example, if the nominal approach path angle 302 is 3 degrees (from the horizon 308), the flight path angle 306 of the aircraft 304 would be greater if it was, for example, 4 degrees. It may be seen (as indicated by the dashed line 307) that if the aircraft continues at a 4 degree descent, it could strike the terrain 310 without entering the RFCF envelope 314 and without receiving an alert.

Figure 4:
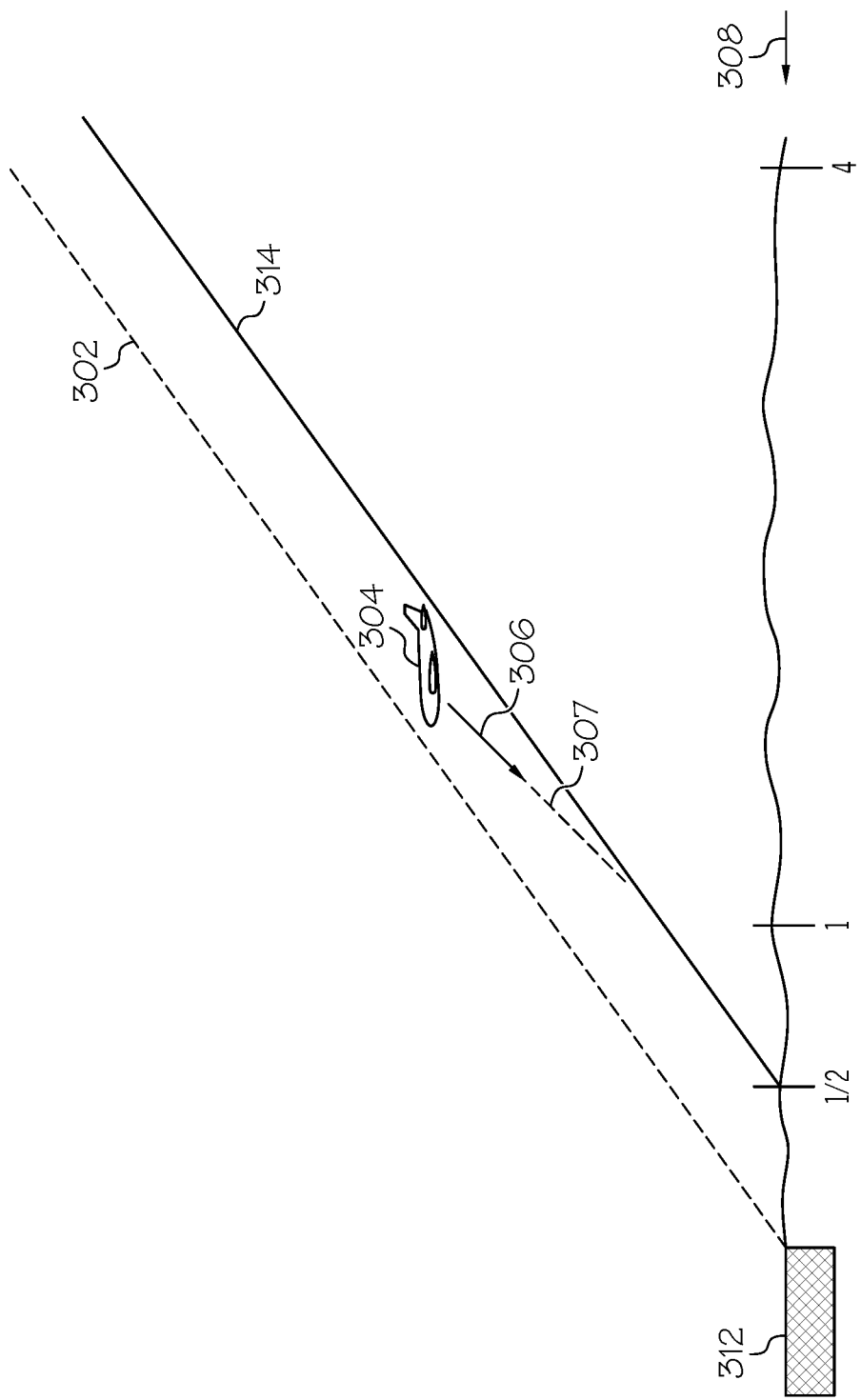
FIG. 4 is a graphical representation of an aircraft making an approach to a runway wherein the RFCF envelope associated therewith has shifted in accordance with an exemplary embodiment.
Figure 5:
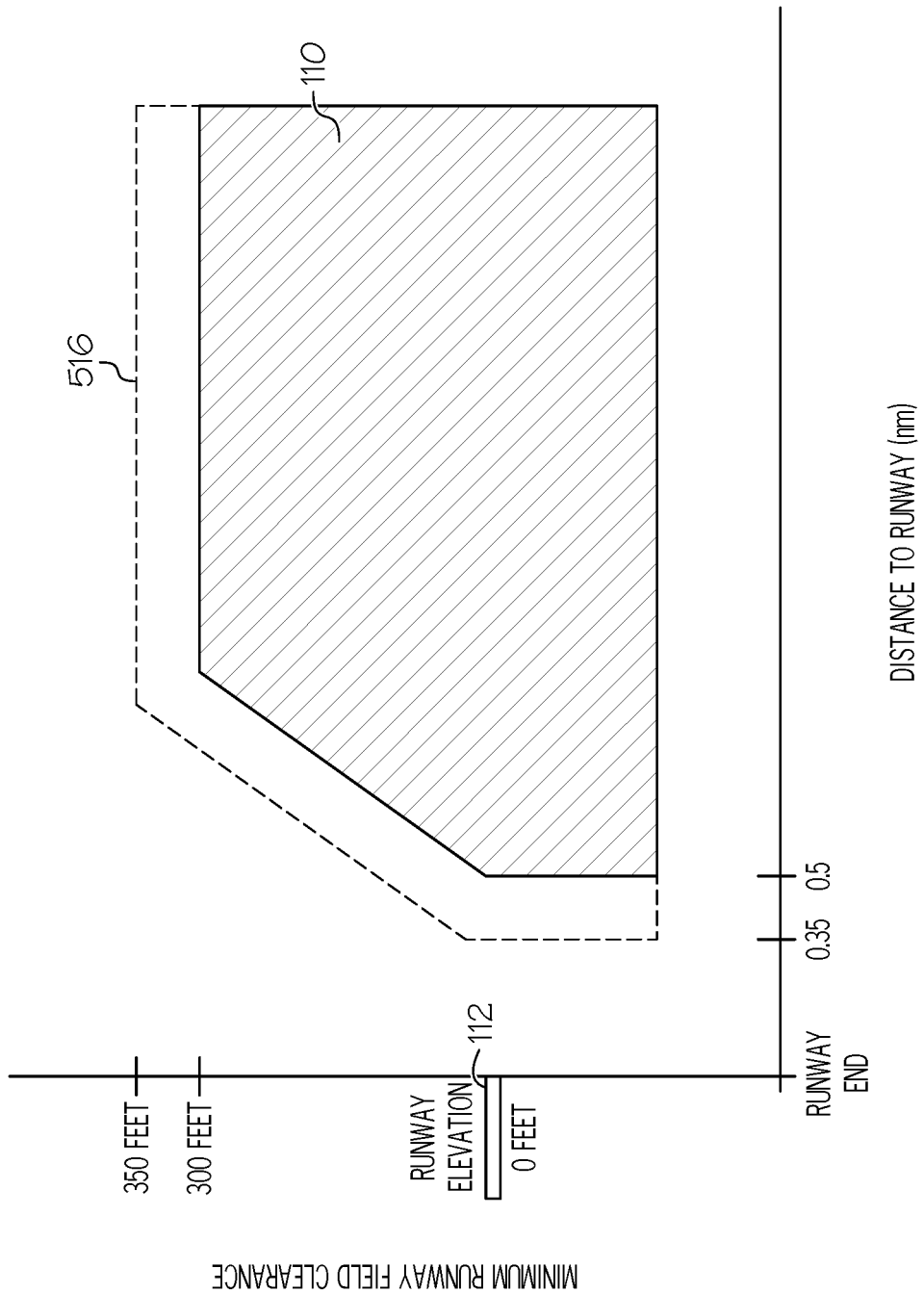
FIG. 5 is a graphical representation of an RFCF envelope in accordance with another exemplary embodiment.
Figure 6:
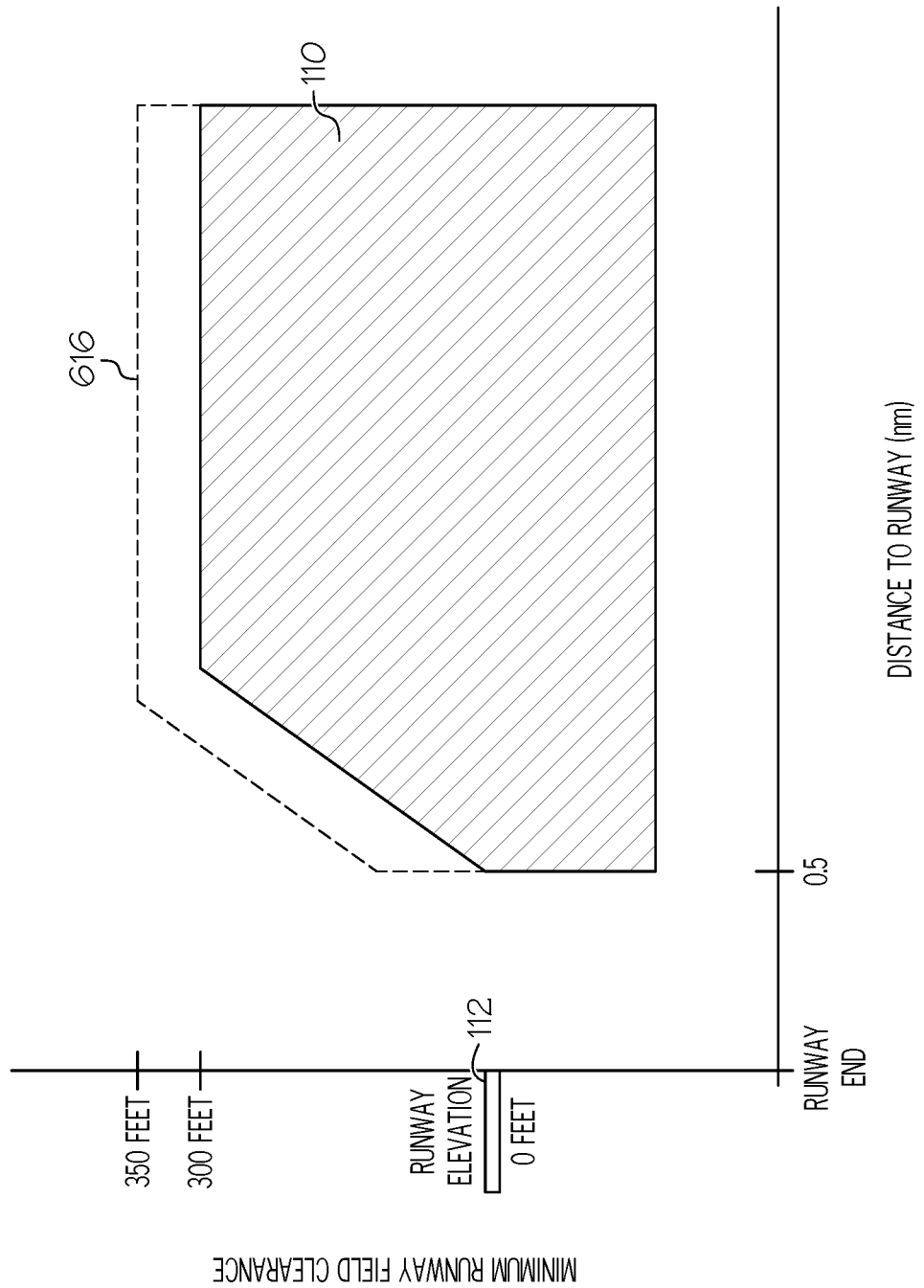
FIG. 6 is a graphical representation of an RFCF envelope in accordance with yet another exemplary embodiment.

Referring to FIG. 4 and in accordance with this exemplary embodiment, when the aircraft 304 is below the nominal approach path 302 and is descending at an angle 307 greater than the nominal approach path angle 302 as illustrated in FIG. 3, the RFCF envelope 314 is shifted towards, i.e., closer to, the runway 312 (to about a half mile as shown). The amount, or distance, of this shift of the RFCF envelope 314 is determined by one or more of several factors, including flight parameters such as airspeed, rate of descent, weight, available thrust, and original distance from the RFCF envelope 314 to the runway 312. Preferably, the entire RFCF envelope 314 is shifted toward the runway 312; however, in some embodiments the shape of the RFCF envelope 314 may change (see FIG. 5) or in other embodiments, the RFCF envelope 314 may raise to a higher elevation with respect to the runway elevation (see FIG. 6).

Figure 7:
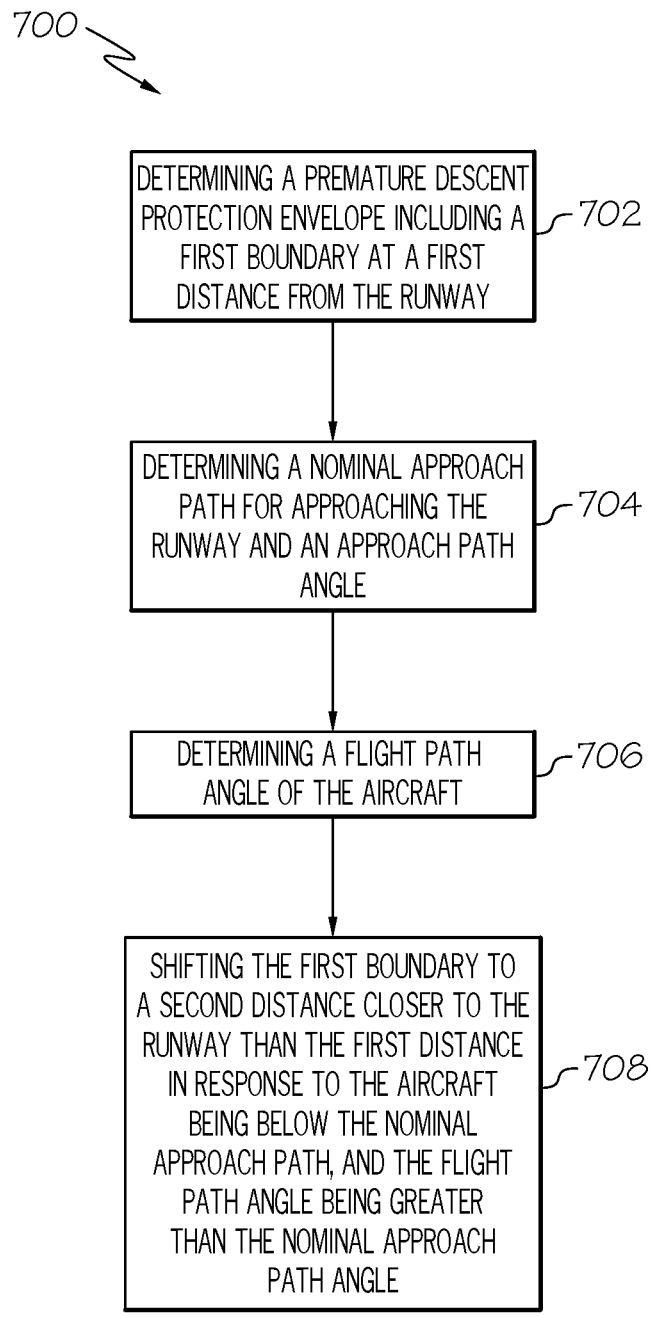
FIG. 7 a flow diagram of an exemplary method suitable for use with the system of FIG. 2 in accordance with the exemplary embodiments.

FIG. 7 is a flow chart that illustrates an exemplary embodiment of a method 700 suitable for use with the system 100. Method 700 represents one implementation of a method for shifting a RFCF alert area for a selected runway. The various tasks performed in connection with method 700 may be performed by software, hardware, firmware, or any combination thereof. For illustrative purposes, the following description of method 700 may refer to elements mentioned above in connection with preceding FIGS. In practice, portions of method 700 may be performed by different elements of the described system, e.g., a processor, a display element, or a data communication component. It should be appreciated that method 700 may include any number of additional or alternative tasks, the tasks shown in FIG. 7 need not be performed in the illustrated order, and method 700 may be incorporated into a more comprehensive procedure or method having additional functionality not described in detail herein. Moreover, one or more of the tasks shown in FIG. 7 could be omitted from an embodiment of the method 700 as long as the intended overall functionality remains intact.

In accordance with the exemplary method of FIG. 7, a method of shifting a RFCF envelope for an aircraft approaching a runway includes determining 702 the RFCF envelope including a first boundary at a first distance from the runway; determining 704 a nominal approach path for approaching the runway and a approach path angle; determining 706 a flight path angle of the aircraft; and shifting 708 the first boundary to a second distance closer to the runway than the first distance in response to the aircraft being below the nominal approach path, and the flight path angle being greater than the nominal approach path angle.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. A system for shifting a premature descent protection envelope for an aircraft making an approach to a selected runway, the system comprising:
    at least one data storage element configured to:
        store a runway database including data associated with the selected runway; and
        determine a runway field clearance floor (RFCF) envelope for the selected runway;
    an avionics system configured to:
        determine flight parameters for an aircraft making an approach to the runway;
        determine the premature descent protection envelope (PDP) for the selected runway; and
        determine a nominal approach path angle to the runway from a precision approach path indicator/visual approach slope indicator (PAPI/VASI) slope; and
    a processor coupled to the data storage element and the avionics system, and configured to:
        dynamically shift the determined PDP envelope in an upward direction from the selected runway in response to the flight parameters and the nominal approach path angle when the aircraft is making the approach within the PDP envelope, where the shifted PDP envelope provides additional notice of premature descent by the aircraft; and
        dynamically shift the RFCF envelope in an upward direction towards the selected runway in response to the flight parameters when the aircraft is below the nominal approach path angle and at the flight path angle steeper than the nominal approach path angle, where the shifted RFCF envelope provides additional notice of premature descent by the aircraft.

2. The system of claim 1, where the determined PDP envelope is dynamically shifted in a forward direction from the selected runway in response to the flight parameters and the nominal approach path angle when the aircraft is making the approach within the PDP envelope, where the shifted PDP envelope provides additional notice of premature descent by the aircraft.

3. The system of claim 1, where the at least one data storage element dynamically shifts the RFCF envelope in a forward direction towards the selected runway in response to the flight parameters when the aircraft is below the nominal approach path angle and at the flight path angle steeper than the nominal approach path angle, where the shifted RFCF envelope provides additional notice of premature descent by the aircraft.

4. The system of claim 1, further comprising:
at least one data storage element configured to:
  determine a terrain clearance floor (TCF) envelope for the selected runway; and
  dynamically shift the TCF envelope in an upward direction towards the selected runway in response to the flight parameters when the aircraft is below the nominal approach path angle and at the flight path angle steeper than the nominal approach path angle, where the shifted TCF envelope provides additional notice of premature descent by the aircraft.

5. The system of claim 4, where the at least one data storage element dynamically shifts the TCF envelope in a forward direction towards the selected runway in response to the flight parameters when the aircraft is below the nominal approach path angle and at the flight path angle steeper than the nominal approach path angle, where the shifted TCF envelope provides additional notice of premature descent by the aircraft.

6. The system of claim 1 where the avionics system is further configured to:
determine the nominal approach path from one of a group consisting of an instrument landing system approach path, a vertical navigation path angle, or a precision approach path indicator/visual approach slope indicator slope.

7. The system of claim 1 where the avionics system is further configured to:
determine a position of the aircraft from a navigation system selected from at least one of the group consisting of a global positioning system, an inertial reference system, a radio-based navigation system, and an altimeter.

8. The system of claim 1 where the flight parameters consist of one of the group selected from a ground speed, a rate of descent, a weight, available thrust, and a distance between the premature descent protection envelope and the runway.

9. The system of claim 1 where the runway database is further configured to:
store the nominal approach path angle.

10. A method of shifting a premature descent protection envelope for an aircraft approaching a runway, comprising:
determining a runway field clearance floor (RFCF) envelope for the runway;
determining the premature descent protection envelope (PDP) including a first boundary at a first distance from the runway;
determining a nominal approach path for approaching the runway and an approach path angle;
determining a flight path angle of the aircraft;
shifting the first boundary in an upward direction from the runway in response to the aircraft being below the nominal approach path, and the flight path angle being greater than the nominal approach path angle; and
dynamically shifting the RFCF envelope in an upward direction from the runway in response to the aircraft being below the nominal approach path, and the flight path angle being greater than the nominal approach path angle.

11. The method of claim 10, where the first boundary is shifted in a forward direction toward the runway in response to the aircraft being below the nominal approach path, and the flight path angle being greater than the nominal approach path angle.

12. The method of claim 10, where the RFCF envelope is dynamically shifted in a forward direction toward the runway in response to the aircraft being below the nominal approach path, and the flight path angle being greater than the nominal approach path angle.

13. The method of claim 10, further comprising:
determining a terrain clearance floor (TCF) envelope for the runway; and
dynamically shifting the TCF envelope in an upward direction from the runway in response to the aircraft being below the nominal approach path, and the flight path angle being greater than the nominal approach path angle.

14. The method of claim 10, where the TCF envelope is dynamically shifted in a forward direction toward the runway in response to the aircraft being below the nominal approach path, and the flight path angle being greater than the nominal approach path angle.

15. The method of claim 10, wherein determining a nominal approach path comprises:
determining the nominal approach path from one of a group consisting of an instrument landing system approach path, a vertical navigation path angle, or a precision approach path indicator/visual approach slope indicator slope.

16. The method of claim 10, further comprising:
determining a position of the aircraft from a navigation system selected from one of the group consisting of a global positioning system, an inertial reference system, a radio-based navigation system, and an altimeter.

17. The method of claim 10, further comprising:
determining flight parameters of the aircraft consisting of one of the group selected from a ground speed, a rate of descent, a weight, available thrust, and a distance between the premature descent protection envelope and the runway.

* * * * *